(12) United States Patent
Golov (10) Patent No.: US 11,250,891 B1
(45) Date of Patent: Feb. 15, 2022

(54) VALIDATION OF DRAM CONTENT USING INTERNAL DATA SIGNATURE

(71) Applicant: Micron Technology, Inc., Boise, ID (US)

(72) Inventor: Gil Golov, Backnang (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/991,870

(22) Filed: Aug. 12, 2020

(51) Int. Cl.
  *G11C 7/06* (2006.01)
  *G11C 7/10* (2006.01)
  *G06F 21/78* (2013.01)
  *G06F 21/60* (2013.01)

(52) U.S. Cl.
  CPC ............ *G11C 7/065* (2013.01); *G06F 21/602* (2013.01); *G06F 21/78* (2013.01); *G11C 7/1039* (2013.01); *G11C 7/1063* (2013.01)

(58) Field of Classification Search
  CPC ..... G11C 7/065; G11C 7/1039; G11C 7/1063; G06F 21/78; G06F 21/602
  See application file for complete search history.

(56) References Cited

U.S. PATENT DOCUMENTS

| | | | |
|---|---|---|---|
| 6,694,451 B2 | 2/2004 | Atkinson | |
| 7,260,758 B1* | 8/2007 | Agrawal | G11C 29/56 714/733 |
| 8,978,135 B2 | 3/2015 | Pearson et al. | |
| 9,003,252 B1* | 4/2015 | Aharoni | G11C 29/76 714/733 |
| 2002/0056056 A1* | 5/2002 | Bannatyne | G11C 29/12 714/25 |
| 2003/0014686 A1* | 1/2003 | Barth, Jr. | G11C 29/44 714/6.32 |
| 2014/0129888 A1* | 5/2014 | Chickanosky | G01R 31/31724 714/733 |

* cited by examiner

*Primary Examiner* — Ajay Ojha
(74) *Attorney, Agent, or Firm* — Greenberg Traurig (57) ABSTRACT

Systems, methods, and apparatus related to validating data stored in a memory system. In one approach, a DRAM stores data for a host device. A controller that manages the DRAM receives a command from the host device to generate a signature. The controller also receives data from the host device that indicates a region of the DRAM. In response to receiving the command, the controller reads data from the indicated region. A signature is generated by the controller based on the data read from the indicated region. The generated signature is sent to the host device in response to the command.

19 Claims, 7 Drawing Sheets

VALIDATION OF DRAM CONTENT USING INTERNAL DATA SIGNATURE

FIELD OF THE TECHNOLOGY

At least some embodiments disclosed herein relate to memory systems in general, and more particularly, but not limited to memory systems configured to validate stored data.

BACKGROUND

Various types of volatile memory devices can be used to store data. In general, a host device can use one or more volatile memory devices to store data. For example, the host device can read data from the memory devices as needed during operation, such as execution of software. The host device can also store data by writing the data to the memory device.

One type of volatile memory device is a dynamic random access memory (DRAM). A DRAM stores each bit of data in a memory cell. A DRAM is typically implemented in an integrated circuit chip. In one example, DRAM chips are used as the main memory for computers and graphics cards.

A DRAM is typically arranged in a rectangular array of charge storage cells consisting of one capacitor and transistor for each data bit that is stored. The array contains rows and columns for accessing selected ones of the storage cells. For example, each row can be used as a word line to select storage cells that are arranged on that particular row. Sense amplifiers use the columns to read data bits from the selected storage cells. In one example, the read data is sent to a host device that requested the data by sending a read command to a controller of the DRAM.

BRIEF DESCRIPTION OF THE DRAWINGS

The embodiments are illustrated by way of example and not limitation in the figures of the accompanying drawings in which like references indicate similar elements.

DETAILED DESCRIPTION

The following disclosure describes various embodiments for validating stored data in a memory system. At least some embodiments herein relate to a DRAM that generates an internal signature used to validate data stored in the DRAM. The DRAM may, for example, store data used by a host device (e.g., a computing device of an autonomous vehicle, or another computing device that accesses data stored in the memory device). In one example, the DRAM is used as main memory for a controller of an electric vehicle that controls a hardware component of the vehicle.

In prior approaches, there are situations in which a host desires to rapidly validate the content of DRAM used by the host. In one example, the content is critical software or data used by the host to operate a vehicle. Typically, the host reads data from the DRAM and then the host itself calculates a data signature used to monitor whether the content of the DRAM has been unintentionally changed. For example, the host can compare two or more data signatures determined at different times to make this determination.

However, the data interface between the host and the DRAM limits the speed at which the host can calculate such data signatures. For example, a slow data interface can prevent rapidly reading data by the host from the DRAM in order for the host to calculate the data signature. This creates the technical problem of undesirably slowing the determination of whether DRAM content is valid.

To address these and other technical problems, various embodiments of the present disclosure provide a memory system that internally generates a signature for data stored in the memory system. In one embodiment, a controller internally generates a data signature for one of more regions of a DRAM that store data (e.g., software or other content used by a host). In one example, the DRAM generates a signature for one or more banks of the DRAM. In one example, the DRAM calculates a signature on multiple banks in parallel. In one example, the signature is a hash function (e.g., a cyclic redundancy check (CRC), and/or an error correction code (ECC)). The generated signatures can be sent to a host device, which can use the signatures to determine whether DRAM content is valid, or instead has been corrupted.

Advantages provided by various embodiments described herein include providing a faster way to calculate data signatures for memory devices such as DRAM. The signatures can be used to validate content of the DRAM. In one advantage, a controller of a vehicle can more quickly check whether content of a DRAM has changed during a standby mode. In one advantage, a host can determine more quickly whether DRAM content has changed while performing critical or essential processes that use the DRAM content.

In one embodiment, a data signature for a DRAM is generated more quickly by calculating the signature internally in the DRAM. A signature generator provided inside the DRAM can access a much higher data throughput and/or more parallel data, which is not limited by the data interface between the host and the DRAM. In addition, a signature can be calculated on multiple banks of the DRAM in parallel.

In one embodiment, a signature is generated internally by a controller of a DRAM and sent to a host device. The host device compares the generated signature to a prior signature that has been calculated for the DRAM. In one example, the prior signature was previously sent to the host device by the controller before the DRAM entered a standby mode. The host device compares the generated signature to the prior signature. Based on this comparison, the host device can determine whether the data stored in the DRAM is valid. If the host device determines that the stored data is invalid, the host device can perform one or more actions. In one example, the host device signals a computing device that software stored in the DRAM and used by the computing device is corrupted (e.g., has been compromised by a hacker).

In one embodiment, a host requests that a DRAM internally generate a content signature for stored data that is used by the host. In one example, a host checks whether a region (e.g., bank) of DRAM suffered data errors during runtime. In one case, this is desirably performed for regions that are not supposed to change frequently during use (e.g., artificial intelligence coefficients of inference systems, DSP coefficients, and/or executable code). An internal data signature can be generated for the region(s) and used to periodically test the DRAM. This can be done by comparing the calculated signature against prior or known signature(s) to confirm data validity.

In one example, a check is made to determine whether there has been a content change for a DRAM during standby mode. The data signature of the DRAM is tested before entering standby mode and again after exiting standby mode. A signature mismatch indicates that the content was changed during the standby mode.

In one embodiment, a DRAM stores data for host device. A controller of the DRAM receives a command from the host device to generate a signature. The controller also receives data from the host device that indicates a region of the DRAM for which the signature is to be generated. In one example, the data is address information sent with the command. In response to receiving the command, the controller reads data from the indicated region of the DRAM. In one example, the indicated region is one or more banks of the DRAM. After reading the data from the indicated region, the controller generates a signature based on the read data. The generated signature is stored, for example, in a register of the DRAM. The controller sends the generated signature to the host device to provide a response to the command.

Figure 1:
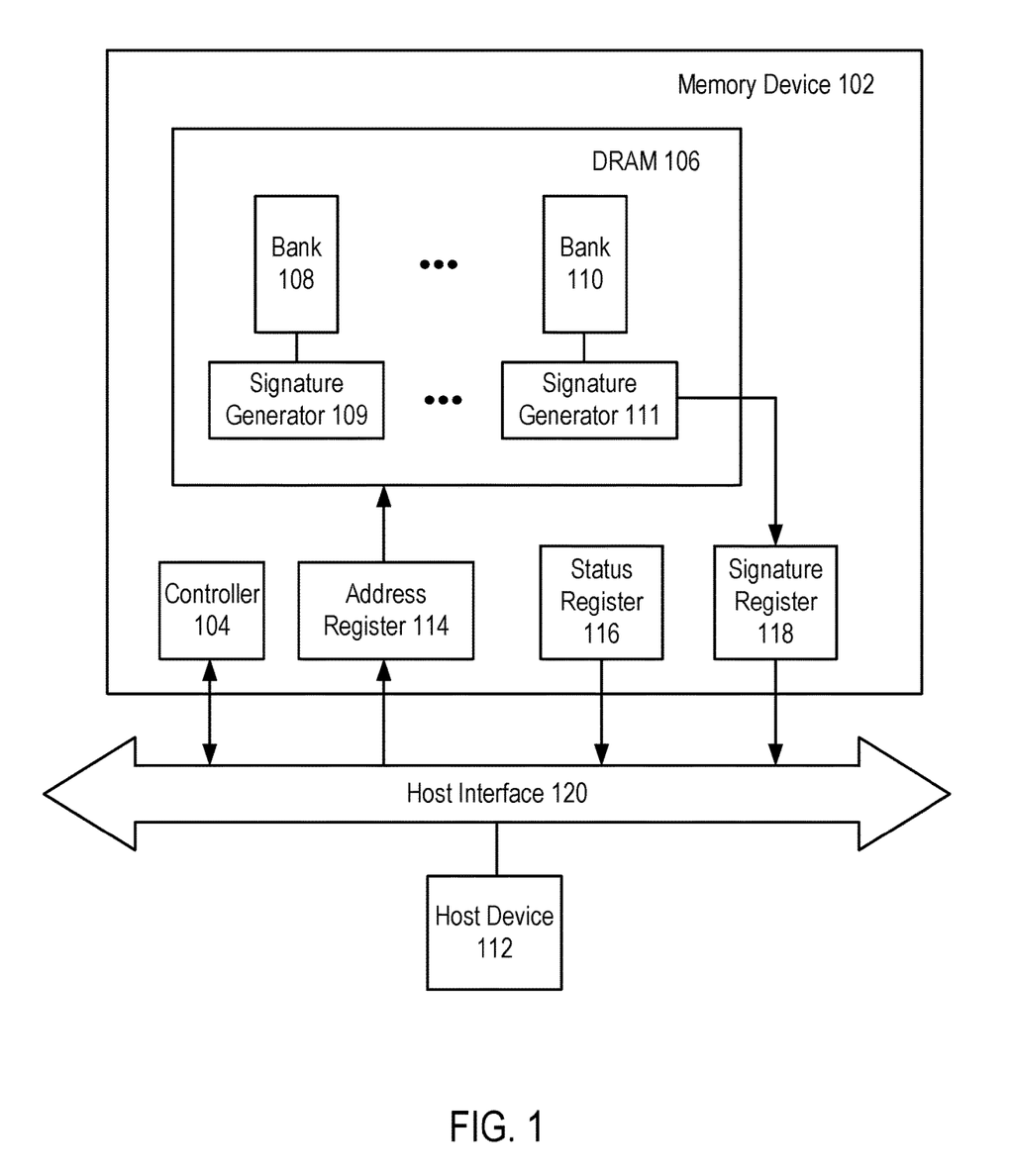
FIG. 1 shows a memory device that generates one or more internal signatures to validate stored data, in accordance with some embodiments.

FIG. 1 shows a memory device 102 that generates one or more internal signatures to validate stored data, in accordance with some embodiments. Memory device 102 includes DRAM 106 and controller 104. In one example, DRAM 106 and controller 104 are on the same silicon or other semiconductor die. In one example, memory device 102 is one or more DRAM chips.

DRAM 106 includes banks 108-110 used to store data for host device 112. Controller 104 receives various commands from host device 112 over host interface 120. These commands can include, for example, read and write commands. In one example, a write command is received to store data in bank 108. In one example, a read command is received to read the data stored in bank 108.

Memory device 102 includes address register 114, which receives addresses from host 112 over host interface 120. In one example, the addresses indicate a location in DRAM 106 in which data is stored. For example, controller 104 receives a read command and an address from host device 112.

Memory device 102 includes signature generators 109-111. In one example, each bank of DRAM 106 has a corresponding signature generator. As illustrated, signature generator 109 generates a signature for data stored in bank 108, and signature generator 111 generates a signature for data stored in bank 110.

One or more signatures generated by signature generators 109-111 are stored in signature register 118. In one example, multiple signatures are combined or otherwise processed to provide a single final signature. Host device 112 can read the value of signature register 118 over host interface 120 in order to obtain a signature(s) generated by memory device 102.

In one embodiment, controller 104 causes signature generators 109-111 to read stored data from banks 108-110 and generate signatures in response to receiving a command from host device 112 to generate a signature. In one example, an address is provided with the command to generate the signature. The address includes data to indicate the one or more regions of DRAM 106 for which the signature is to be generated. In one example, the address indicates one or more of banks 108-110 for which a signature is to be generated. In one example, the address indicates a bank and the starting and ending row of the bank.

After one or more signatures are generated by signature generators 109-111, controller 104 updates a value in status register 116 to indicate that the one or more signatures have been generated. Host device 112 can read the value of status register 116 over host interface 120 in order to determine a status of signature generation by memory device 102. In one example, when controller 104 receives the command to generate a signature, status register 116 is set to an initial value that indicates the requested signature has not yet been generated.

In one embodiment, host device 112 sends a command to controller 104 to generate a signature by memory device 102. Then, host device 112 repeatedly reads the value of status register 116 in order to determine when the signature has been generated. Host device 112 can read the value status register 116 by sending a command to controller 104 to read the signature completion status.

When host device 112 reads a value from status register 116 that indicates the signature has been generated, host device 112 sends a command to controller 104 requesting the signature. In response, controller 104 sends the value of the signature in signature register 118 to host device 112.

In one example, a controller (e.g., controller 104) decodes a command from a host (e.g., host device 112) to generate a signature for bank x (e.g., bank 108). The controller also receives data from the host associated with the command that indicates a starting row s and an ending row e (e.g., an address, which is stored in address register 114, and/or data sent to controller 104 with the command). In response to receiving the command, the controller performs the following for bank x:

The controller writes '0' to register Reg VLDx (e.g., status register 116)
The controller sets an initial value in register regCRCx to variable CRC (e.g., 0) (e.g., signature register 118)
The controller reads the data from the memory (e.g., reads an entire column at once, starting with row s and ending with row e) (e.g., reads one data bit from each column for an open row of a memory array, where each open row is in the range between starting row s and ending row e)
After the column data is read, a CRC variable is calculated (e.g., a hash of data for all column bits 0 to n) (e.g., a hash of all data bits stored in a row buffer and that have been obtained from reading the data bits from all columns for an open row of the memory array)
After completion, the calculated CRC variable content is stored in register regCRCx, and then value '1' is stored in register RegVLDx In one example, the controller (e.g., a memory control block of a DRAM chip) decodes a command from the host to read RegVLDx. The controller sends the value of register RegVLDx back to the host. In one example, the controller decodes a command from the host to read RegCRCx. The controller sends the value of register RegCRCx back to the host.

In one embodiment, memory device 102 generates signatures in parallel for some or all banks of memory device 102. In one example, host device 112 sends one or more commands (e.g., raw commands sent one after the other) to generate signatures for selected banks (e.g., banks 1, 2, 3 of 8 total banks) (not shown).

In one embodiment, host device 112 does not need to wait for the completion of the signature generation of any given bank before host device 112 sends the request for another bank. In one example, commands to generate signatures are queued in a command buffer (not shown) of memory device 102. In one example, these commands are executed in the order received. In one example, these commands are executed in a priority order as indicated by host device 112. In one example, these commands are executed in a priority order as determined by controller 104 (e.g., using sensor data received by controller 104 over host interface 120 from host device 112, and/or other sensor or context data).

In one example, controller 104 decodes a command from host device 112 to generate a signature for all banks. Host device 112 also indicates a starting row s, and an ending row e that are associated with the command. In response, controller 104 performs signature calculations for all of the banks in parallel. Then, controller 104 updates a value in status register 116, and updates a value in signature register 118 for each bank (e.g., controller 104 updates all register values regCRC0 . . . n and regVLD0 . . . n accordingly).

In one example, host device 112 performs an operation to obtain a content signature for data stored in DRAM 106 (e.g., a host operation to get a content signature of bank x). Host device 112 sends a command to controller 104 to generate a signature for bank x, starting row s, ending row e. Then, host device 112 sends a command to read status register 116 (e.g., RegVLDx from a DRAM chip). Host device 112 repeatedly sends the command to read status register 116 until host device 112 determines that the register value of status register 116 indicates that the signature has been generated (e.g., the register value is '1'). Then, host device 112 sends a command to controller 104 to read signature register 118 (e.g., register RegCRCx), which contains the DRAM content signature for bank x, starting row s, ending row e.

In one example, host device 112 performs an operation to obtain a content signature for all banks of DRAM 106. Host device 112 sends a command to controller 104 to generate a signature for all banks of DRAM 106. Host device 112 sends data that indicates a starting row s, and an ending row e. Host device 112 repeatedly sends a command to read status register 116 (e.g., register RegVLDx) until the value read from status register 116 indicates that at least one signature has been generated (e.g., for one of the banks, and/or for all banks). In one example, controller 104 updates status register 116 to have a register value of '1' when a signature has been generated for bank x.

Then, host device 112 sends a command to read signature register 118 (e.g., register RegCRCx), which contains the DRAM content signature bank x, start row s, end row e. In response, controller 104 sends the value of signature register 118. In one example, the value of signature register 118 is sent for the first bank for which a signature is been generated. Controller 104 continues to generate signatures for the remaining banks of DRAM 106. As the signature for each bank is generated, the value of status register 106 is updated to indicate that the signature for one or more banks has been generated. Host device 112 reads the value of status register 116 to determine that signatures for one or more additional banks have been generated. Host device 112 reads the value of each generated signature for the additional banks from signature register 118.

Figure 2:
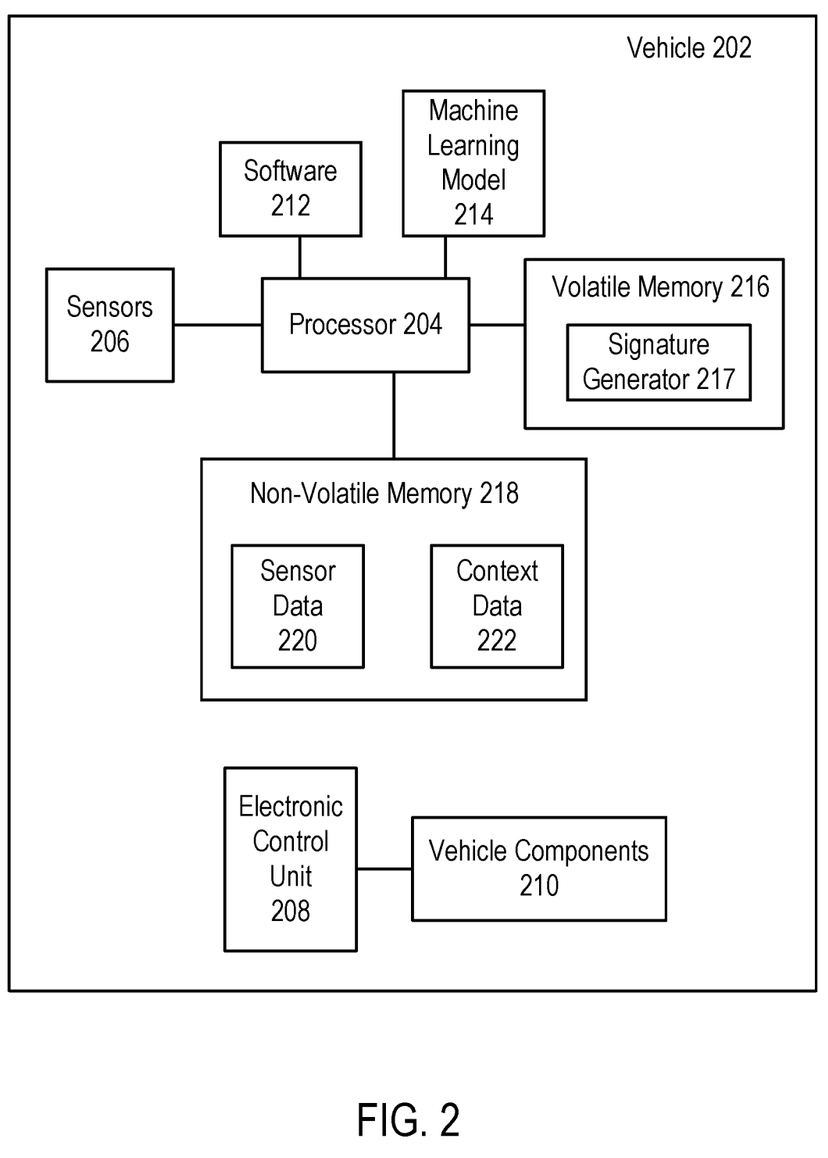
FIG. 2 shows a vehicle with volatile memory including a signature generator used to validate stored data, in accordance with some embodiments.

FIG. 2 shows a vehicle 202 with volatile memory 216 that includes an internal signature generator 217 used to validate stored data, in accordance with some embodiments. In one example, volatile memory 216 is a DRAM memory chip or chips. Memory device 102 is an example of volatile memory 216. One or more of signature generators 109-111 is an example of signature generator 217.

Processor 204 stores data in volatile memory 216 during operation. In one example, software 212 is loaded into volatile memory 216 during booting, for example, of electronic control unit 208, which may include processor 204. Processor 204 also stores data in non-volatile memory 218. In one example, software 212 is critical software used to control one or more essential or critical functions of vehicle 202. In one example, software 212 is used to control electronic control unit 208.

Host device 112 is an example of processor 204. In one example, processor 204, volatile memory 216, non-volatile memory 218, and/or electronic control unit 208 are coupled to host interface 120. In one example, electronic control unit 208 controls one or more vehicle components 210. In one example, vehicle components 210 include hardware systems and components to control various functions of vehicle 202 such as navigation, motor control, braking, and/or management of infotainment systems.

During operation of vehicle 202, sensors 206 collect sensor data 220 that is processed by processor 204 to control one or more functions of vehicle 202. In one example, at least a portion of sensor data 220 is stored in volatile memory 216 and/or non-volatile memory 218. In some cases, context data 222 is stored in volatile memory 216 and/or non-volatile memory 218. Context data 222 includes, for example, data associated with a context of operation of vehicle 202. Context data 222 may include a portion of sensor data 220. In one example, context data 222 includes data regarding an environment in which vehicle 202 operates (e.g., presence of other vehicles or objects around vehicle 202, weather, etc.).

Processor 204 can use an output from machine learning model 214 as part of controlling functions of vehicle 202. Inputs to machine learning model 214 can include sensor data 220, other data collected from sensors 206, data received by vehicle 202 via wireless communication from other vehicles and/or a server, or context data 222.

In one example, machine learning model 214 comprises one or more artificial neural networks (ANNs). One or more neuron models for the ANNs can be stored in volatile memory 216. During operation of vehicle 202, the validity of the neuron model(s) stored in volatile memory 216 can be checked using signature generator 217. For example, signature generator 217 can determine whether a neuron model stored in volatile memory 216 has been corrupted, for example as described above.

In one embodiment, processor 204 sends a command to volatile memory 216 to request generation of a signature by signature generator 217. Processor 204 compares the generated signature to a prior signature and determines that data stored in volatile memory 216 has been corrupted. In one example, processor 204 causes rebooting of one or more computing devices vehicle 202 in response to this determination. In one example, electronic control unit 208 is rebooted.

Other actions can be performed by processor 204 in response to determining that stored data has been corrupted. These actions can include, for example, requesting an over-the-air (OTA) transfer of a software update for software 212 and/or machine learning model 214. In one example, the actions include blocking usage of the corrupted data by processor 204 and/or a computing device of vehicle 202. In one example, the actions include restoring of the corrupted data by writing data from non-volatile memory 218 to volatile memory 216.

In one example, the restored data can be data previously saved by processor 204 as a backup of certain data stored in volatile memory 216. In one example, the backup includes data identified by processor 204 as critical data for the operation of vehicle 202. In one example, the data identified as critical data is based on an output from machine learning model 214. In one example, the identification of the critical data is based at least in part on context data 222 and/or sensor data 220, for example stored in volatile memory 216 and/or non-volatile memory 218.

Figure 3:
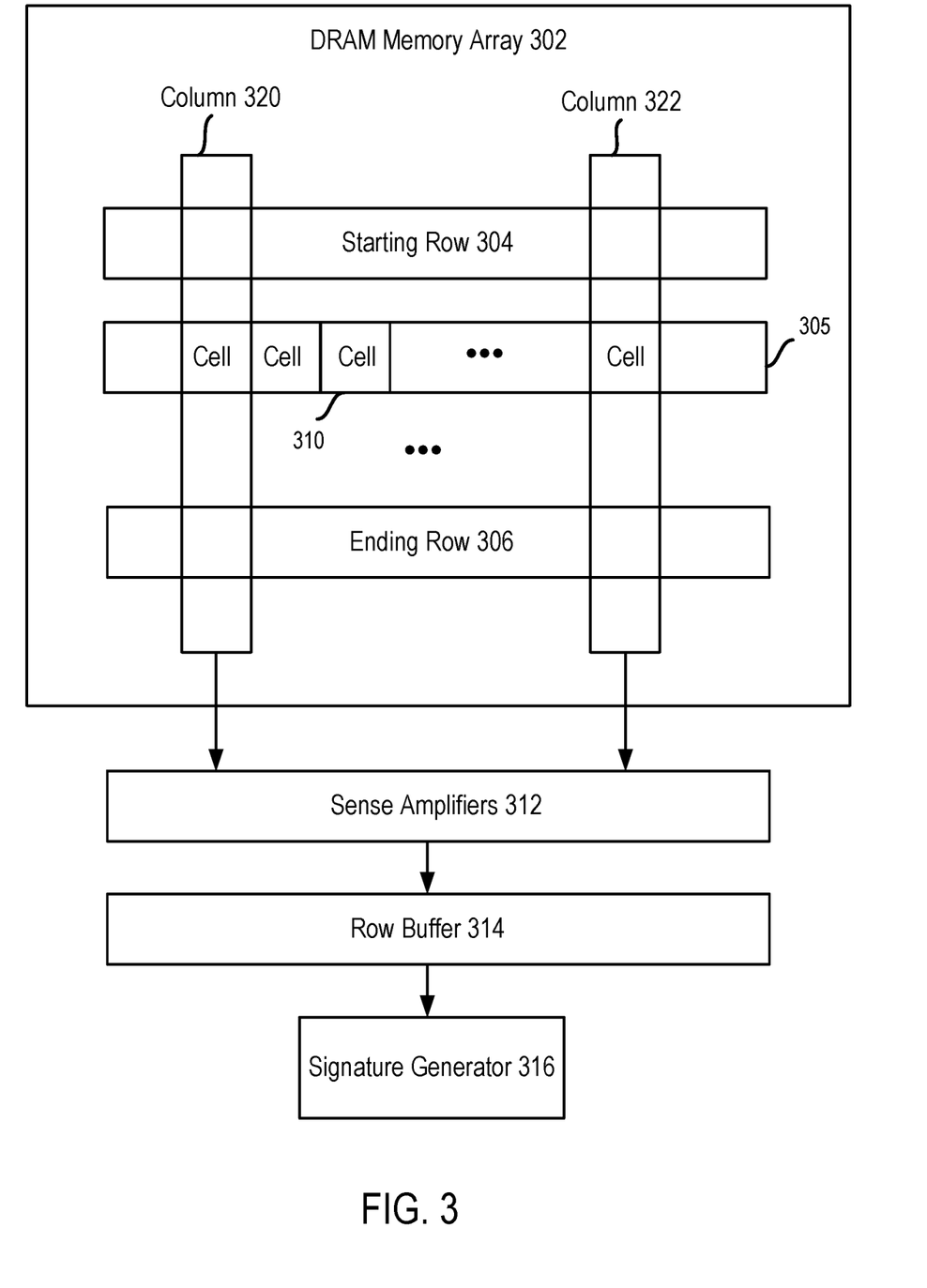
FIG. 3 shows a DRAM having a memory array from which data is read to generate a signal for validating data stored in the memory array, in accordance with some embodiments.

FIG. 3 shows a DRAM having a memory array 302 from which data is read to generate a signal for validating data stored in the memory array 302, in accordance with some embodiments. In one example, memory array 302 is a portion of a bank of DRAM 106. In one example, bank 108 includes memory array 302.

Memory array 302 includes columns 320-322 and various rows 305 used to access storage cells 310 (e.g., one bit for each of the columns) in memory array 302. Rows 305 include starting row 304 and ending row 306. In operation, row 305 is a word line of memory array 302 that is used to select cells 310 in response to a command received from a host device (e.g., host device 112). Row 305 is selected based on address information provided with the command.

After row 305 is selected, row 305 becomes an open row for reading data bits stored in storage cells 310 of the open row. Sense amplifiers 312 are used to read the data bits for the open row. The values read for each data bit are stored in row buffer 314.

Data from memory array 302 can be used to generate a signature by signature generator 316. In one example, the signature is generated in response to receiving a command from a host device. One or more of signature generators 109-111 are an example of signature generator 316.

In one example, one or more data bits read from memory array 302 for any given open row, such as described above, are used by signature generator 316 to generate the signature. In one example, data bits stored in row buffer 314 are read by signature generator 316 to calculate the signature. In one example, the signature generated by signature generator 316 is stored in signature register 118.

In one example, a command is received from host device 112 requesting that a signature be generated. In response, signature generator 316 generates the signature. In one example, the command is accompanied by data indicating rows of memory 302 to use in calculating the signature. In one example, the data indicates starting row 304 and ending row 306.

Figure 4:
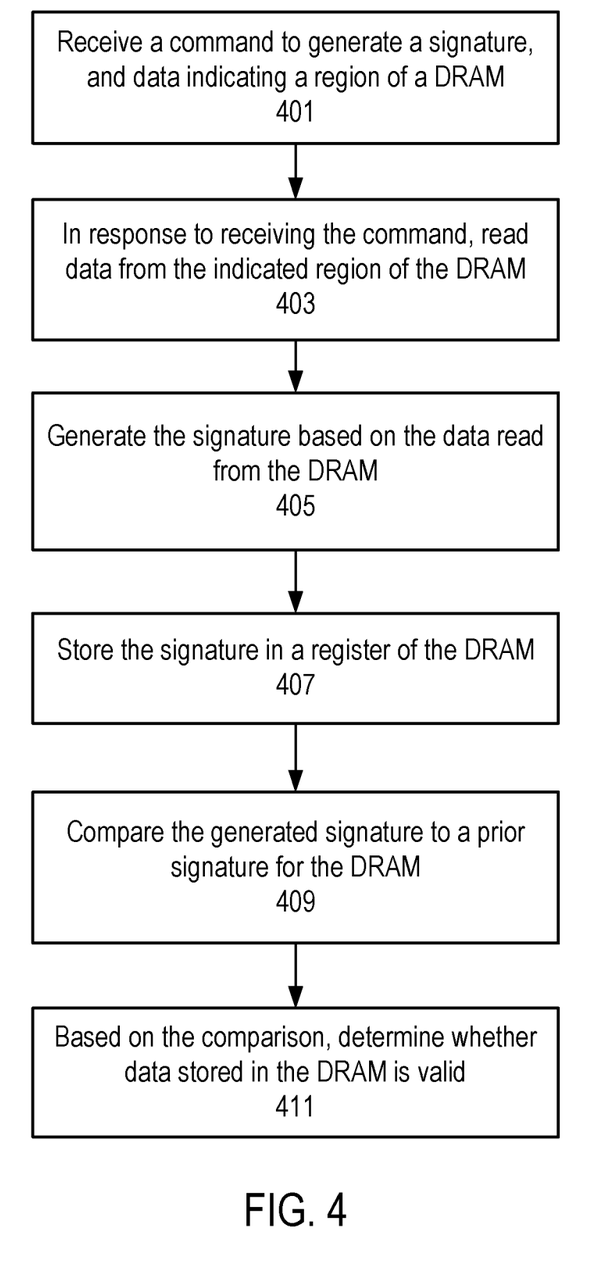
FIG. 4 shows a method for generating an internal signature by a volatile memory device so that a host device can determine whether data stored in the DRAM is valid, in accordance with some embodiments.

FIG. 4 shows a method for generating an internal signature by a volatile memory device so that a host device can determine whether data stored in the DRAM is valid, in accordance with some embodiments. For example, the method of FIG. 4 can be implemented in the system of FIG. 1. In one example, the internal signature is generated by one or more of signature generators 109-111. In one example, the volatile memory device is memory device 102, and the host device is host device 112.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., controller 104 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, a command to generate a signature is received. Data indicating a region of a DRAM is received with the command. In one example, the command to generate the signature is received by controller 104 from host device 112. In one example, the region of the DRAM is one or more of banks 108-110.

At block 403, in response receiving the command, data is read from the indicated region of the DRAM. In one example, data is read from memory array 302 for rows in a range from starting row 304 to ending row 306.

At block 405, the signature is generated based on the data read from the DRAM. In one example, the signature is generated by signature generator 109, 111, 217, 316.

At block 407, the signature is stored in a register of the DRAM. In one example, the signature is stored in signature register 118.

At block 409, the generated signature is compared to a prior signature for the DRAM. In one example, the generated signature is compared to a prior signature stored by host device 112. The prior signature was previously generated by signature generators 109-111 based on an earlier command sent to controller 104 by host device 112 to generate the prior signature.

At block 411, based on the comparison, it is determined whether data stored in the DRAM is valid. In one example, processor 204 determines that neuron models for machine learning model 214 have been corrupted. In one example, processor 204 determines that at least a portion of software 212 stored in volatile memory 216 is not valid.

In one embodiment, before entering a standby mode, a DRAM content signature of indicated memory region(s) is validated. In one approach, host device 112 sends a command to controller 104 to calculate the data signature(s) of the indicated data region(s), and then reads back the result(s) (e.g., one or more signatures can be determined for each region(s) of the DRAM). In one example, the indicated data regions are indicated by data that accompanies one or more commands sent to controller 104 to generate the data signature.

In one example, each signature(s) is determined by calculating a hash function on data stored in the indicated region(s) (e.g., all data stored in a given region of volatile memory to be protected). Other examples of determining a signature include the use of a hash function, a cyclic redundancy check (CRC), and/or an error correction code (ECC). The calculation result of the foregoing is the data signature.

After exiting the standby mode, the system (e.g., host device 112) determines a new signature for the content of the DRAM. Also, the host reads a prior signature (e.g., a prior signature determine as described above) that is stored in a non-volatile memory (e.g., non-volatile memory of the host device 112, or non-volatile memory 218).

The prior signature (that was stored in non-volatile memory, for example of memory device 102) and the new signature (for the current DRAM content) are compared. If the signatures match, the system continues to execute software that was previously running in the system by using the current content of the DRAM to return to the prior existing state of the system prior to entering standby mode.

If the prior and new signatures do not match, this indicates that an unintended change of the DRAM content has occurred during the standby mode. In response to the signature mismatch, a full reset and boot of the system is executed (e.g., electronic control unit 208 is booted using data from non-volatile memory 218).

In one embodiment, a standby mode is used in automotive systems such as for infotainment systems. The standby mode avoids a lengthy boot process of the infotainment system (e.g., after a shut-down or power off). In one example, when a driver switches off a vehicle such as a car that includes an infotainment system, a DRAM device (e.g., volatile memory 216) that contains software and the current states of the infotainment system goes into a standby mode. When the driver switches on the car again, the infotainment system leaves the standby mode, and then continues running from the same point that the system was left in when entering the standby mode.

Figure 5:
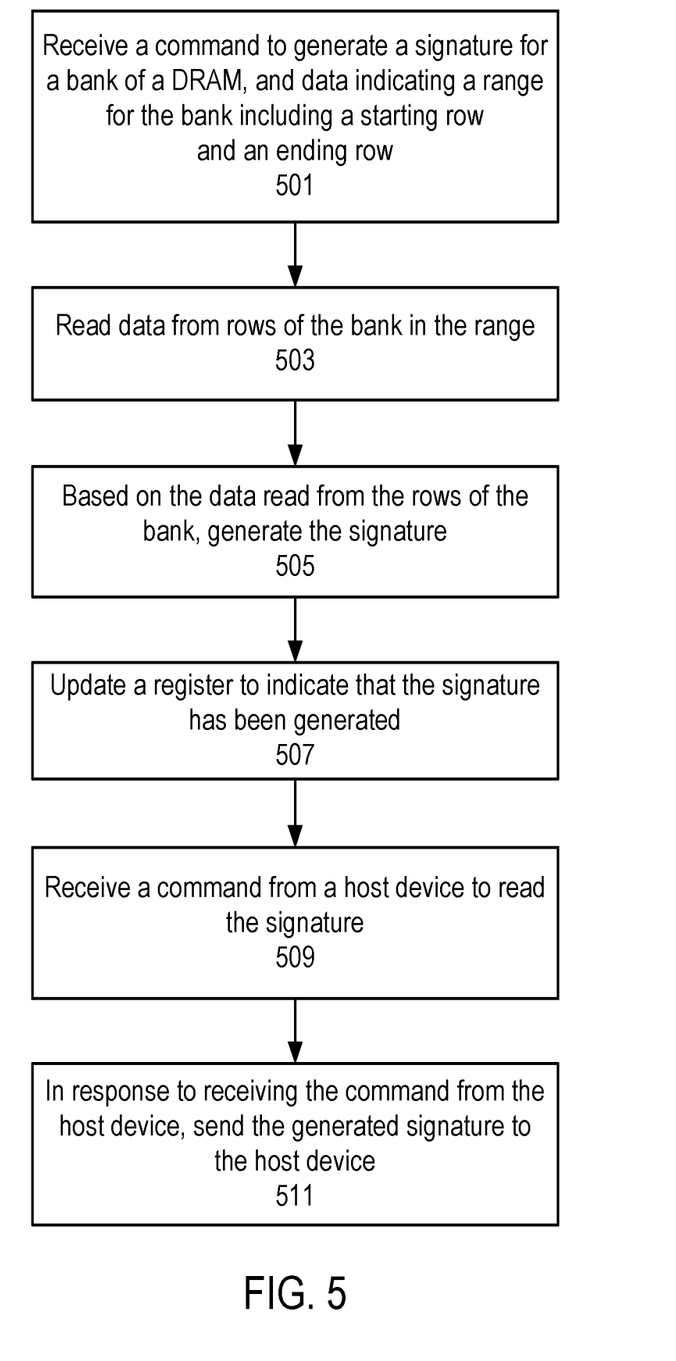
FIG. 5 shows a method for a volatile memory device to generate an internal signature in response to receiving a command from a host device, in accordance with some embodiments.

FIG. 5 shows a method for a volatile memory device to generate an internal signature in response to receiving a command from a host device, in accordance with some embodiments. For example, the method of FIG. 5 can be implemented in the system of FIG. 2. In one example, the internal signature is generated by signature generator 217. In one example, the volatile memory device is volatile memory 216, and the host device is processor 204 or electronic control unit 208.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by one or more processing devices (e.g., processor 204 of FIG. 2).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, a command is received to generate a signature for one or more banks of a DRAM. Data is received with the command that indicates a range for the one or more banks, including a starting row and an ending row (e.g., starting and ending rows for each bank). In one example, the DRAM is volatile memory 216.

At block 503, data is read from rows of the one or more banks in the indicated range. In one example, controller 104 reads data from bank 110, which is used for generating a signature by signature generator 111.

At block 505, based on the data read from the rows of the banks, the requested signature is generated. In one example, a respective signature is generated for each of the banks. In one example, the signature is generated for all banks. In one example, signature generator 316 generates a signature based on data stored in memory array 302 for cells 310 that are accessed by rows 305 ranging from starting row 304 to ending row 306.

At block 507, a register is updated to indicate that the signature has been generated. In one example, status register 116 is updated.

At block 509, a command is received from a host device to read the signature. In one example, the command is received from host device 112.

At block 511, in response to receiving the command from the host device, the generated signature is sent to the host device. In one example, the value of the generated signature stored in signature register 118 is sent to host device 112 in response to the command.

In one embodiment, a system includes: a dynamic random access memory (DRAM) (e.g., memory device 102) configured to store data for a host device (e.g., host device 112); and a controller (e.g., controller 104) configured to: receive, from the host device, a command to generate a signature, and data indicating a region of the DRAM for which the signature is to be generated; in response to receiving the command, read data from the indicated region of the DRAM; generate, based on the data read from the indicated region of the DRAM, the signature; and store the signature in a register (e.g., signature register 118).

In one embodiment, the register is a first register, and the system further includes a second register (e.g., status register 116). The controller is further configured to, in response to generating the signature, update a value stored in the second register from a first value to a second value. The first value indicates that the signature has not been generated, and the second value indicates that the signature is stored in the first register.

In one embodiment, the system further includes an address register configured to receive an address from the host device. The address includes at least a portion of the data indicating the region of the DRAM.

In one embodiment, the DRAM includes banks (e.g., banks 108-110) of memory arrays; the data indicating the region of the DRAM includes a range for a first bank including a starting row and an ending row; and reading the data includes reading data from memory cells in rows of the first bank within the range.

In one embodiment, the system further includes: sense amplifiers (e.g., sense amplifiers 312) configured to read bits in parallel from columns of a selected row in a memory array of the DRAM; and a row buffer configured to latch the bits read from the columns. The generated signature is based at least in part on the latched bits.

In one embodiment, the command is a first command, and the controller is further configured to: receive, from the host device, a second command to read the signature; in response to receiving the second command, read the signature stored in the register; and send, to the host device, the signature read from the register.

In one embodiment, the DRAM includes one or more DRAM chips, and the indicated region is at least one bank of the one or more DRAM chips.

In one embodiment, a method includes: receiving, from a host device by a controller of a dynamic random access memory (DRAM), a command to generate a signature, and data indicating a region of the DRAM for which the signature is to be generated (e.g., the data indicates bank 110 and/or the data indicates starting row 304 and ending row 306); in response to receiving the command, reading data from the indicated region of the DRAM; generating, by the controller, the signature based on the data read from the indicated region of the DRAM; and storing the signature in a register of the DRAM.

In one embodiment, the method further includes sending the generated signature to the host device. The host device is configured to: compare the generated signature to a prior signature for the DRAM, where the prior signature was previously sent to the host device by the controller; based on comparing the generated signature to the prior signature, determine whether data stored in the DRAM is valid; and in response to determining that the data stored in the DRAM is not valid, perform at least one action for a computing device that uses the data stored in the DRAM.

In one embodiment, the register is a first register. The method further includes, in response to generating the signature, updating a value stored in a second register from a first value to a second value. The first value indicates that the signature has not been generated, and the second value indicates that the signature has been generated.

In one embodiment, the data indicating the region of the DRAM includes at least one of an address, an address range, a row address, a column address, an identification of a bank, a starting row, an ending row, an identification of a column, a bit range, or a bit number.

In one embodiment, the command is a first command, the signature is a first signature, the register is a first register, and the DRAM includes banks of memory cells. The method further includes: receiving, from the host device, a second command to generate a second signature for each of the banks; in response to receiving the second command, generating the second signatures in parallel; and storing the second signatures in second registers.

In one embodiment, the method further includes: in response to generating the second signatures, updating values stored in third registers from first values to second values. Each first value is set in response to receiving the second command, and each second value is set to indicate that the second signature for the respective bank has been generated.

In one embodiment, the signature is a first signature corresponding to a first bank of the DRAM. The method further includes receiving, from the host device and prior to completion of generating the first signature, a second command to generate a second signature for a second bank of the DRAM.

In one embodiment, the method further includes: reading, by sense amplifiers, data in parallel from columns (e.g., columns 320, 322) of an open row (e.g., row 305) in a memory array of the DRAM; and latching the data read from the columns into a row buffer of the DRAM; where the generated signature is based at least in part on the latched data.

In one embodiment, the data indicating the region of the DRAM includes a range including a starting row and an ending row. The open row is within the range.

In one embodiment, the signature is a first signature, the register is a first register, the command is a first command to generate the first signature for a first bank of the DRAM, and the first command is received in a command buffer of the DRAM. The method further includes: receiving, in the command buffer while the first signature is being generated, a second command to generate a second signature for a second bank of the DRAM, and data indicating a range for the second bank including a starting row and an ending row; reading first data from the second bank, where the first data is read for rows of the second bank in the range; generating, based on the first data, the second signature; and storing the second signature in a second register.

In one embodiment, the method further includes: in response to storing the second signature, updating a value of a third register (e.g., status register 116) to indicate that the second signature has been generated; receiving, from the host device, a third command to read the third register; sending, to the host device, the value of the third register; receiving, from the host device, a fourth command to read the second signature, where the host device sends the fourth command in response to receiving the value of the third register; and in response to receiving the fourth command, sending the second signature stored in the second register to the host device.

In one embodiment, the host device (e.g., host device 112) repeatedly sends the third command until receiving the value of the third register.

In one embodiment, a non-transitory computer-readable medium stores instructions which, when executed by at least one processing device, cause the at least one processing device to: receive a command to generate a signature, and data indicating a region of a dynamic random access memory (DRAM); in response to receiving the command, read data from the indicated region of the DRAM; generate, based on the data read from the indicated region of the DRAM, the signature; and store, by the controller, the signature.

In some embodiments, a signature generator (e.g., signature generator 109, 217, 316) can be used to generate a signature for data stored in a memory sub-system. For example, a memory sub-system can be a storage device, a memory module (e.g., memory device 102), or a hybrid of a storage device and memory module. Examples of storage devices and memory modules are described below in conjunction with FIG. 6. In general, a host system can utilize a memory sub-system that includes one or more components, such as memory devices that store data. The host system can provide data to be stored at the memory sub-system, and can request data to be retrieved from the memory sub-system.

Figure 6:
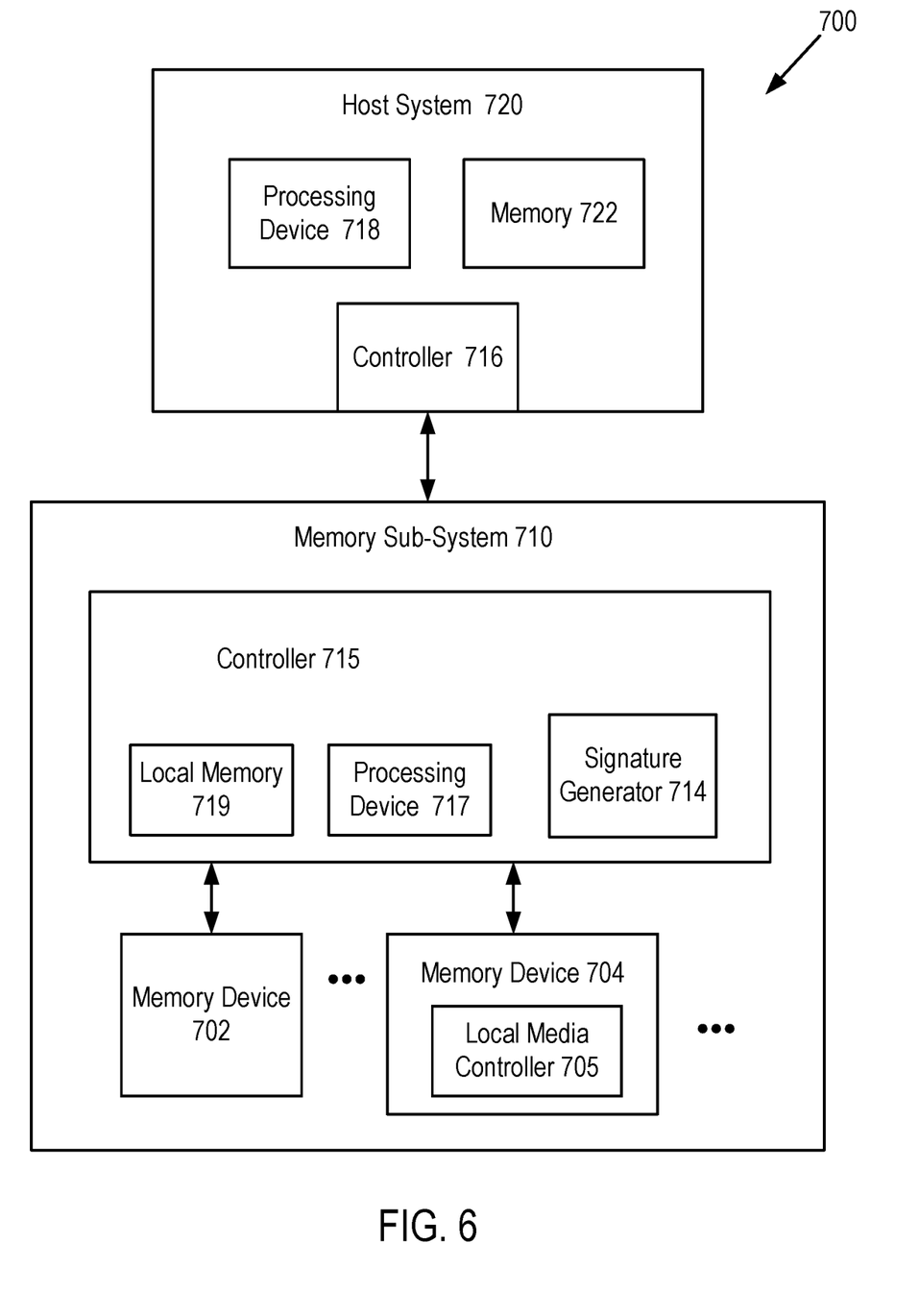
FIG. 6 illustrates an example computing system that includes a memory sub-system in accordance with some embodiments of the present disclosure.

FIG. 6 illustrates an example computing system 700 that includes memory sub-system 710 in accordance with some embodiments of the present disclosure. The memory sub-system 710 can include media, such as one or more volatile memory devices (e.g., memory device 102), one or more non-volatile memory devices (e.g., memory device 218), or a combination of such. Memory device 102 is an example of memory sub-system 710, and host device 112 is an example of host system 720.

A memory sub-system 710 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 700 can be, for example, a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 700 can include a host system 720 that is coupled to one or more memory sub-systems 710. FIG. 6 illustrates one example of a host system 720 coupled to one memory sub-system 710.

The host system 720 can include a processor chipset (e.g., processing device 718) and a software stack executed by the processor chipset. The processor chipset can include one or more cores, one or more caches, a memory controller (e.g., controller 716) (e.g., NVDIMM controller), and a storage protocol controller (e.g., PCIe controller, SATA controller). The host system 720 uses the memory sub-system 710, for example, to write data to the memory sub-system 710 and read data from the memory sub-system 710.

The host system 720 can be coupled to the memory sub-system 710 via a physical host interface. Examples of a physical host interface include, but are not limited to, a Serial Advanced Technology Attachment (SATA) interface, a Peripheral Component Interconnect Express (PCIe) interface, Universal Serial Bus (USB) interface, Fibre Channel, Serial Attached SCSI (SAS), a Double Data Rate (DDR) memory bus, Small Computer System Interface (SCSI), a Dual In-line Memory Module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 720 and the memory sub-system 710. The host system 720 can further utilize an NVM Express (NVMe) interface to access components (e.g., memory devices 704) when the memory sub-system 710 is coupled with the host system 720 by the PCIe interface. The physical host interface can provide an interface for passing control, address, data, and other signals between the memory sub-system 710 and the host system 720. FIG. 6 illustrates a memory sub-system 710 as an example. In general, the host system 720 can access multiple memory sub-systems via a same communication connection, multiple separate communication connections, and/or a combination of communication connections.

The processing device 718 of the host system 720 can be, for example, a microprocessor, a central processing unit (CPU), a processing core of a processor, an execution unit, etc. In some instances, the controller 716 can be referred to as a memory controller, a memory management unit, and/or an initiator. In one example, the controller 716 controls the communications over a bus coupled between the host system 720 and the memory sub-system 710. In general, the controller 716 can send commands or requests to the memory sub-system 710 for desired access to memory devices 702, 704. The controller 716 can further include interface circuitry to communicate with the memory sub-system 710. The interface circuitry can convert responses received from memory sub-system 710 into information for the host system 720.

The controller 716 of the host system 720 can communicate with controller 715 of the memory sub-system 710 to perform operations such as reading data, writing data, or erasing data at the memory devices 702, 704 and other such operations. In some instances, the controller 716 is integrated within the same package of the processing device 718. In other instances, the controller 716 is separate from the package of the processing device 718. The controller 716 and/or the processing device 718 can include hardware such as one or more integrated circuits (ICs) and/or discrete components, a buffer memory, a cache memory, or a combination thereof. The controller 716 and/or the processing device 718 can be a microcontroller, special purpose logic circuitry (e.g., a Field Programmable Gate Array (FPGA), an Application Specific Integrated Circuit (ASIC), etc.), or another suitable processor.

The memory devices 702, 704 can include any combination of the different types of non-volatile memory components and/or volatile memory components. The volatile memory devices (e.g., memory device 702) can be, but are not limited to, Random Access Memory (RAM), such as Dynamic Random Access Memory (DRAM) and Synchronous Dynamic Random Access Memory (SDRAM).

Some examples of non-volatile memory components include a Negative-AND (NAND) type flash memory and write-in-place memory, such as three-dimensional cross point memory. A cross point array of non-volatile memory can perform bit storage based on a change of bulk resistance, in conjunction with a stackable cross-gridded data access array. Additionally, in contrast to many flash-based memories, cross point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 704 can include one or more arrays of memory cells. One type of memory cell, for example, Single Level Cells (SLCs) can store one bit per cell. Other types of memory cells, such as Multi-Level Cells (MLCs), Triple Level Cells (TLCs), Quad-Level Cells (QLCs), and penta-level cells (PLCs) can store multiple bits per cell. In some embodiments, each of the memory devices 704 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 704 can be grouped as pages that can refer to a logical unit of the memory device used to store data. With some types of memory (e.g., NAND), pages can be grouped to form blocks.

Although non-volatile memory devices such as 3D cross point type and NAND type memory (e.g., 2D NAND, 3D NAND) are described, the memory device 704 can be based on any other type of non-volatile memory, such as Read-Only Memory (ROM), Phase Change Memory (PCM), self-selecting memory, other chalcogenide based memories, Ferroelectric Transistor Random-Access Memory (FeTRAM), Ferroelectric Random Access Memory (FeRAM), Magneto Random Access Memory (MRAM), Spin Transfer Torque (STT)-MRAM, Conductive Bridging RAM (CBRAM), Resistive Random Access Memory (RRAM), Oxide based RRAM (OxRAM), Negative-OR (NOR) flash memory, and Electrically Erasable Programmable Read-Only Memory (EEPROM).

A memory sub-system controller 715 (or controller 715 for simplicity) can communicate with the memory devices 704 to perform operations such as reading data, writing data, or erasing data at the memory devices 704 and other such operations (e.g., in response to commands scheduled on a command bus by controller 716). The controller 715 can include hardware such as one or more Integrated Circuits (ICs) and/or discrete components, a buffer memory, or a combination thereof. The hardware can include digital circuitry with dedicated (i.e., hard-coded) logic to perform the operations described herein. The controller 715 can be a microcontroller, special purpose logic circuitry (e.g., a Field Programmable Gate Array (FPGA), an Application Specific Integrated Circuit (ASIC), etc.), or another suitable processor.

The controller 715 can include a processing device 717 (processor) configured to execute instructions stored in a local memory 719. In the illustrated example, the local memory 719 of the controller 715 includes an embedded memory configured to store instructions for performing various processes, operations, logic flows, and routines that control operation of the memory sub-system 710, including handling communications between the memory sub-system 710 and the host system 720.

In some embodiments, the local memory 719 can include memory registers storing memory pointers, fetched data, etc. The local memory 719 can also include Read-Only Memory (ROM) for storing micro-code. While the example memory sub-system 710 in FIG. 6 has been illustrated as including the controller 715, in another embodiment of the present disclosure, a memory sub-system 710 does not include a controller 715, and can instead rely upon external control (e.g., provided by an external host, or by a processor or controller separate from the memory sub-system).

In general, the controller 715 can receive commands or operations from the host system 720 (e.g., a command to generate a signature) and can convert the commands or operations into instructions or appropriate commands to achieve the desired access to, or other result associated with, the memory devices 704. The controller 715 can be responsible for other operations such as wear leveling operations, garbage collection operations, error detection and error correction code (ECC) operations, encryption operations, caching operations, and address translations between a logical address (e.g., Logical Block Address (LBA), namespace) and a physical address (e.g., physical block address) that are associated with the memory devices 704.

The controller 715 can further include host interface circuitry to communicate with the host system 720 via the physical host interface. The host interface circuitry can convert the commands received from the host system into command instructions to access the memory devices 704 as well as convert responses associated with the memory devices 704 into information (e.g., a generated signature, or a signature status) for the host system 720.

The memory sub-system 710 can also include additional circuitry or components that are not illustrated. In some embodiments, the memory sub-system 710 can include a cache or buffer (e.g., DRAM) and address circuitry (e.g., a row decoder and a column decoder) that can receive an address from the controller 715 and decode the address to access the memory devices 704.

In some embodiments, the memory devices 704 include local media controllers 705 that operate in conjunction with memory sub-system controller 715 to execute operations on one or more memory cells of the memory devices 704. An external controller (e.g., memory sub-system controller 715) can externally manage the memory device 704 (e.g., perform media management operations on the memory device 704). In some embodiments, a memory device 704 is a managed memory device, which is a raw memory device combined with a local controller (e.g., local controller 705) for media management within the same memory device package. An example of a managed memory device is a Managed NAND (MNAND) device.

In one embodiment, the computing system 700 includes a signature generator 714 in the memory sub-system 710 that generates a signature for data stored in, for example, memory device 702. In some embodiments, the controller 715 in the memory sub-system 710 includes at least a portion of the signature generator 714. In other embodiments, or in combination, the controller 716 and/or the processing device 718 in the host system 720 includes at least a portion of the signature generator 714. For example, the controller 715, the controller 716, and/or the processing device 718 can include logic circuitry implementing the signature generator 714. For example, the controller 715, or the processing device 718 (processor) of the host system 720, can be configured to execute instructions stored in memory for performing the operations of the signature generator 714.

In some embodiments, the signature generator 714 is implemented in an integrated circuit chip disposed in the memory sub-system 710. In other embodiments, the signature generator 714 is part of an operating system of the host system 720, a device driver, or an application.

In some implementations, a communication channel between the processing device 718 and a memory sub-system 710 includes a computer network, such as a local area network, a wireless local area network, a wireless personal area network, a cellular communications network, a broadband high-speed always-connected wireless communication connection (e.g., mobile network link); and the processing device 718 and the memory sub-system can be configured to communicate with each other using data storage management and usage commands similar to those in NVMe protocol.

A memory sub-system 710 in general can have non-volatile storage media. Examples of non-volatile storage media include memory cells formed in an integrated circuit and magnetic material coated on rigid disks. Non-volatile storage media can maintain the data/information stored therein without consuming power. Memory cells can be implemented using various memory/storage technologies, such as NAND logic gate, NOR logic gate, Phase-Change Memory (PCM), Magnetic Random Access Memory (MRAM), resistive random-access memory, cross point storage and memory devices. A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

The controller (e.g., 715) of a memory sub-system (e.g., 710) can run firmware to perform operations responsive to the communications from the processing device 718. Firmware in general is a type of computer program that provides control, monitoring and data manipulation of engineered computing devices.

Some embodiments involving the operation of the controller 715 can be implemented using computer instructions executed by the controller 715, such as the firmware of the controller 715. In some instances, hardware circuits can be used to implement at least some of the functions. The firmware can be initially stored in the non-volatile storage media, or another non-volatile device, and loaded into the volatile DRAM and/or the in-processor cache memory for execution by the controller 715.

A non-transitory computer-readable medium can be used to store instructions of the firmware of a memory sub-system (e.g., 710). When the instructions are executed by the controller 715 and/or the processing device 717, the instructions cause the controller 715 and/or the processing device 717 to perform a method discussed herein.

In one embodiment, a method (e.g., implemented in memory sub-system 710) generates a signature for data stored in a DRAM (e.g., generating a signature as described for FIG. 1). The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed at least in part by the signature generator 714 of FIG. 6.

Figure 7:
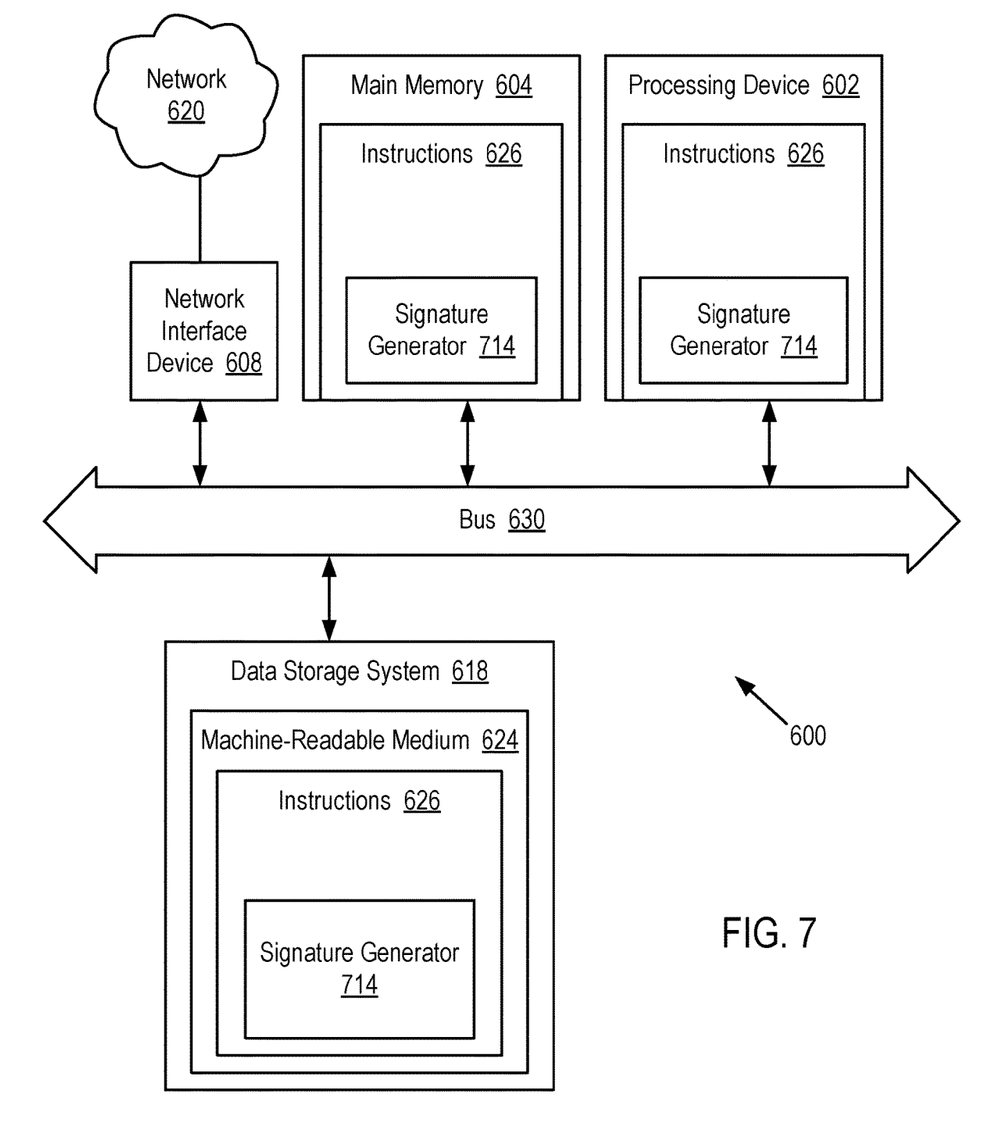
FIG. 7 is a block diagram of an example computer system in which embodiments of the present disclosure can operate.

FIG. 7 illustrates an example machine of a computer system 600 within which a set of instructions, for causing the machine to perform any one or more of the methods discussed herein, can be executed. In some embodiments, the computer system 600 can correspond to a host system (e.g., the host system 720 of FIG. 6) that includes, is coupled to, or utilizes a memory sub-system (e.g., the memory sub-system 710 of FIG. 6), or can be used to perform the operations of signature generator 714 (e.g., to execute instructions to perform operations corresponding to the signature generator 714 described with reference to FIG. 6). In one example, computer system 600 corresponds to memory device 102, and/or host device 112.

In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methods discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

In various embodiments, processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like.

The processing device 602 is configured to execute instructions 626 for performing the operations and steps discussed herein. The computer system 600 can further include a network interface device 608 to communicate over the network 620. The data storage system 618 can include a machine-readable storage medium 624 (also referred to as a computer-readable medium herein) on which is stored one or more sets of instructions 626 or software embodying any one or more of the methods or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 710 of FIG. 6. In one embodiment, the instructions 626 include instructions to implement functionality corresponding to signature generation supported by a signature generator (e.g., the signature generator 714 described with reference to FIG. 6).

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
a dynamic random access memory (DRAM) configured to store data for a host device; and
a controller configured to:
receive, from the host device, a command to generate a signature, and data indicating a region of the DRAM for which the signature is to be generated;
in response to receiving the command, read data from the indicated region of the DRAM;
generate, based on the data read from the indicated region of the DRAM, the signature; and
store the signature in a first register;
in response to generating the signature, update a value stored in a second register from a first value to a second value, wherein the first value indicates that the signature has not been generated, and the second value indicates that the signature has been generated.

2. The system of claim 1, wherein the second value further indicates that the signature is stored in the first register.

3. The system of claim 1, further comprising an address register configured to receive an address from the host device, wherein the address includes at least a portion of the data indicating the region of the DRAM.

4. The system of claim 1, wherein:
the DRAM comprises banks of memory arrays;
the data indicating the region of the DRAM comprises a range for a first bank including a starting row and an ending row; and
reading the data comprises reading data from memory cells in rows of the first bank within the range.

5. The system of claim 1, further comprising:
sense amplifiers configured to read bits in parallel from columns of a selected row in a memory array of the DRAM; and
a row buffer configured to latch the bits read from the columns;
wherein the generated signature is based at least in part on the latched bits.

6. The system of claim 1, wherein the command is a first command, and the controller is further configured to:
receive, from the host device, a second command to read the signature;
in response to receiving the second command, read the signature stored in the first register; and
send, to the host device, the signature read from the first register.

7. The system of claim 1, wherein the DRAM comprises one or more DRAM chips, and the indicated region is at least one bank of the one or more DRAM chips.

8. A method comprising:
receiving, from a host device by a controller of a dynamic random access memory (DRAM), a command to generate a signature, and data indicating a region of the DRAM for which the signature is to be generated;
in response to receiving the command, reading data from the indicated region of the DRAM;
generating, by the controller, the signature based on the data read from the indicated region of the DRAM;
storing the signature in a first register; and
in response to generating the signature, updating a value stored in a second register from a first value to a second value, wherein the first value indicates that the signature has not been generated, and the second value indicates that the signature has been generated.

9. The method of claim 8, further comprising sending the generated signature to the host device, wherein the host device is configured to:
compare the generated signature to a prior signature for the DRAM, wherein the prior signature was previously sent to the host device by the controller;
based on comparing the generated signature to the prior signature, determine whether data stored in the DRAM is valid; and
in response to determining that the data stored in the DRAM is not valid, perform at least one action for a computing device that uses the data stored in the DRAM.

10. The method of claim 8, wherein the data indicating the region of the DRAM comprises at least one of an address, an address range, a row address, a column address, an identification of a bank, a starting row, an ending row, an identification of a column, a bit range, or a bit number.

11. The method of claim 8, wherein the command is a first command, the signature is a first signature, and the DRAM comprises banks of memory cells, the method further comprising:
receiving, from the host device, a second command to generate a second signature for each of the banks;
in response to receiving the second command, generating the second signatures in parallel; and
storing the second signatures in the second registers.

12. The method of claim 11, further comprising:
in response to generating the second signatures, updating values stored in third registers from first values to second values, wherein each first value is set in response to receiving the second command, and each second value is set to indicate that the second signature for the respective bank has been generated.

13. The method of claim 8, wherein the signature is a first signature corresponding to a first bank of the DRAM, the method further comprising receiving, from the host device and prior to completion of generating the first signature, a second command to generate a second signature for a second bank of the DRAM.

14. The method of claim 8, further comprising:
reading, by sense amplifiers, data in parallel from columns of an open row in a memory array of the DRAM; and
latching the data read from the columns into a row buffer of the DRAM;
wherein the generated signature is based at least in part on the latched data.

15. The method of claim 14, wherein the data indicating the region of the DRAM comprises a range including a starting row and an ending row, and wherein the open row is within the range.

16. The method of claim 8, wherein the signature is a first signature, the command is a first command to generate the first signature for a first bank of the DRAM, and the first command is received in a command buffer of the DRAM, the method further comprising:
receiving, in the command buffer while the first signature is being generated, a second command to generate a second signature for a second bank of the DRAM, and data indicating a range for the second bank including a starting row and an ending row;

reading first data from the second bank, wherein the first data is read for rows of the second bank in the range;

generating, based on the first data, the second signature; and storing the second signature in a third second register.

17. The method of claim 16, further comprising:

in response to storing the second signature, updating a value of a fourth register to indicate that the second signature has been generated;

receiving, from the host device, a third command to read the fourth register;

sending, to the host device, the value of the fourth register;

receiving, from the host device, a fourth command to read the second signature, wherein the host device sends the fourth command in response to receiving the value of the fourth register; and in response to receiving the fourth command, sending the second signature stored in the third register to the host device.

18. The method of claim 17, wherein the host device repeatedly sends the third command until receiving the value of the fourth register.

19. A non-transitory computer-readable medium storing instructions which, when executed by at least one processing device, cause the at least one processing device to:

set a stored value to a first value, wherein the first value indicates that a signature has not been generated;

receive a command to generate a first signature, and data indicating a region of a dynamic random access memory (DRAM);

in response to receiving the command, read data from the indicated region of the DRAM;

generate, based on the data read from the indicated region of the DRAM, the first signature;

store, by the controller, the first signature; and update the stored value from the first value to a second value, wherein the second value indicates that the first signature has been generated.

* * * * *